Oct. 14, 1958 D. D. PEEBLES 2,856,290
STARCH PRODUCT AND PROCESS OF MANUFACTURE
Filed Dec. 2, 1955
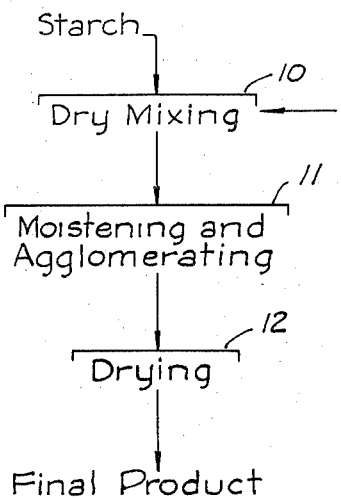
FIG_1_
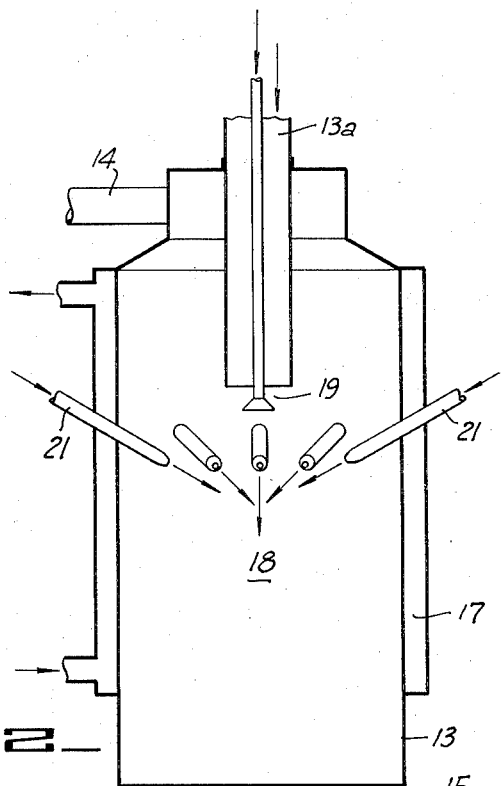
FIG_2_
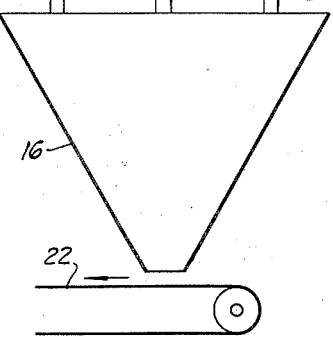
INVENTOR.
David D. Peebles
BY
ATTORNEYS

United States Patent Office 2,856,290
Patented Oct. 14, 1958

2,856,290

STARCH PRODUCT AND PROCESS OF MANUFACTURE

David D. Peebles, Davis, Calif., assignor, by mesne assignments, to Foremost Dairies, Inc., San Francisco, Calif., a corporation of New York Application December 2, 1955, Serial No. 550,696

8 Claims. (Cl. 99—139)

This invention relates generally to dry starch products and processes for manufacturing the same.

The majority of starch marketed in the United States is manufactured from Indian corn, although considerable quantities are made from rice, wheat, potatoes, and sago. One undesirable characteristic of commercial starch is that it is not a free flowing powder, which can be attributed to its low density and finely divided form. This places a limitation on packaging methods used for marketing, since cartons of the type having a pouring spout cannot be used. Also it complicates handling and measuring operations.

In general it is an object of the present invention to provide a dry starch product that is free flowing.

Another object of the invention is to provide a product of the above character which retains all of the desirable characteristics of conventional starch powder.

Another object of the invention is to provide a novel process for manufacturing my starch product.

Additional objects and features of the invention will appear from the following description in which the preferred embodiment has been set forth in detail in conjunction with the accompanying drawing:

Referring to the drawing:

Figure 1 is a flow sheet illustrating one way in which the process can be practiced.

Figure 2 is a side elevational view schematically illustrating apparatus for carrying out the moistening operation.

In the commercial manufacture of cornstarch, Indian corn is subjected to steeping followed by cracking, germ removal, and wet milling to form a mill starch containing starch grains and gluten. The mill starch is then subjected to separating operations, which may employ tabling or centrifuging. The separated starch liquor is then supplied to filters of the continuous type, which deliver a purified starch cake. Drying and grinding of the cake produces the final finished starch powder. Processes for the manufacture of a commercial starch from other materials, such as wheat, rice, sago or potatoes, likewise employ wet separating operations to produce a starch liquor from which the final powdered starch product is obtained.

The chemical and physical characteristics of commercial starch will vary somewhat depending upon the source material and the process employed. However in general all such products have the undesirable characteristic previously mentioned.

In accordance with the present process, a commercial powdered starch is treated in the manner indicated in Figure 1. More particularly the powder is dry mixed at 10 with a dry powered material containing substantial amounts of lactose and milk protein, such as dry skim milk powder of the type produced by commercial spray drying. In practice the amount of skim milk powder introduced at 10 may be such as to comprise from 15 to 25% (by weight) of the total mix. The dry mix from 10 is subjected to a special moistening and aggregating operation 11, during the course of which a considerable amount of moisture is absorbed. The moist aggregated material is then subjected to drying in step 12, to produce a final product having a moisture content comparable to the original commercial starch. The drying is carried out in such a manner that the aggregated form of the material is left substantially intact.

Figure 2 illustrates suitable equipment for carrying out the moistening and aggregating operation. It consists of a vertical chamber 13 having a downwardly extending inlet conduit 13a for receiving the powdered starch as conveyed pneumatically from a supply hopper. Some air is removed from the chamber through conduit 14 whereby air is drawn into the chamber through the lower opening 15 between the main part of the chamber and the discharge hopper 16. The sides of the chamber can be kept warm by circulating warm air through the jacket 17, thereby preventing the condensing of moisture on the inner chamber surfaces.

The free falling powder passes through zone 18 where it is commingled with finely atomized water discharged from nozzle 19. Also, some saturated steam is introduced by way of nozzles 21. The falling powder acquires moisture whereby the material discharged on the lower conveyer 22 has a moisture content (total) ranging for example from about 20 to 25%, about 22% being optimum. It is this moistened material that is subjected to the final finished drying 12, to produce a final total moisture content suitable for a commercial product, as for example a moisture content (total) of the order of 2 to 5%, 3.5% being optimum. The preferred temperature level within the zone 18 can be of the order of 80 to 140° F., 120° F. being optimum.

As the particles of powder are commingled with the vapor and atomized water in zone 18, moisture distributes itself on the surfaces of the particles. Considerable moisture is absorbed by both the starch and the particles of skim milk powder, and the latter acquire a surface stickiness. Sufficient commingling takes place within the treatment zone whereby particles are brought into direct contact, with the result that particles adhere together in the form of random aggregates.

The time period of treatment in the equipment of Figure 2 may range from 10 to 60 seconds. The aggregates discharged from the lower end of the equipment are relatively soft and porous, and will not withstand mechanical handling. They are permitted to rest without handling, as for example on the moving belt 22, and are conveyed to the finish dryer. The period of rest may for example range from 30 to 90 seconds. During transit there is a lowering of the temperature level with the result that the aggregates become firmer and less sticky.

As previously mentioned it is necessary to dry the material by use of equipment which leaves the aggregates relatively intact. Suitable equipment for this purpose employs a screen provided with small perforations, and which is vibrated to cause the material to progress from the feed to the discharge end of the same, and to apply vertical motion to maintain the powder as a loose working layer. In conjunction with the vibrating action, warm drying air is delivered upwardly through the screen to pass upwardly through the layer of powder. The number and size of the openings in the screen is so chosen in relation to the rate of air delivery therethrough that the product moving along the screen is fluffed or levitated to form a layer several times the thickness it would normally have if at rest. By this technique the product is caused to progress along the screen and is at least partially supported by the cushion of air intermingled therewith. This provides drying action without rough or mechanical handling which might break up the powder aggregates. The final product from the finish dryers may be subjected to screening and sizing operations, to produce a material of relatively uniform size requirements.

A typical product made according to the present process has a particle size such that the bulk of the material passes through a 20 mesh screen but remains on an 80 mesh screen. Any small amount of material passing through an 80 mesh screen can be rejected.

The product made in accordance with the foregoing process has a number of desirable characteristics. It is a relatively free flowing granular product, thus facilitating pouring from cartons or containers. It can be used wherever the addition of skim milk solids is desirable or may be tolerated, as for example in puddings or other dry food preparations.

The foregoing process is applicable to any of the commercial starches previously mentioned. Potato starch can be processed without the addition of skim milk solids to produce a free flowing product. However the aggregates are quite friable, as distinguished from the relatively strong and stable aggregates obtained when skim milk solids are added.

It is possible to blend the starch powder with certain powdered ingredients, prior to subjecting it to the present process. For example it is possible to blend in minor amounts of such powdered materials as cereal flour, powdered sugars, flavoring and the like. Starch having a sugar content is suitable for a variety of applications, including various food products.

I claim:

1. In a process for the manufacture of a dry starch product having enhanced wettability, applying moisture to finely divided starch particles while the particles are moving in dispersed condition in a treatment zone, whereby the particles are caused to be sticky, causing the sticky particles to contact while in dispersed condition whereby they adhere together in the form of moist porous aggregates, and then subjecting said aggregates to drying without substantial crushing of the same to form a free flowing product.

2. A process as in claim 1 in which the temperature level in said treatment zone is of the order of 80 to 140° F.

3. A process as in claim 1 in which the temperature level in said treatment zone is of the order of 80 to 140° F., and in which the amount of moisture added in the treatment zone is sufficient whereby the moist porous aggregates have a moisture content of the order of from 20 to 25%.

4. In a process for the manufacture of a dry starch product having enhanced wettability, forming a mixture of dry starch powder and skim milk solids, applying moisture to the finely divided particles of said mixture while the particles are moving in dispersed condition in a treatment zone, causing the particles to contact and adhere together while dispersed to form moist porous aggregates, and then subjecting said aggregates to drying without substantial crushing of the same to form a free flowing product.

5. A process as in claim 4, in which the temperature level in said treatment zone is of the order of from 80 to 140° F.

6. A process as in claim 4 in which the temperature level in the treatment zone is of the order of 80 to 140° F., and in which the amount of moisture added in the treatment zone is sufficient to provide from 20 to 25% moisture in the moist porous aggregates.

7. In a process for the manufacture of a starch product having enhanced wettability, continuously supplying a mixture of dry starch powder and dry skim milk solids to a treatment zone, causing the particles of the mix to progress through said zone in dispersed condition, continuously supplying moisture to said zone whereby the particles are caused to take up moisture while in dispersed condition and contact together to form moist random aggregates, the temperature within said zone being of the order of about 80 to 140° F. and the amount of moisture added to the particles being such that the resulting moist porous aggregates contain from 20 to 25% moisture, removing the moist porous aggregates from said zone and then removing excess moisture from the same while leaving the aggregates substantially intact.

8. As a new article of manufacture, a starch product in the form of porous aggregates, each aggregate comprising finely divided particles of dry starch powder intermixed with particles of dry skim milk solids, the particles of the aggregates being firmly adhered together by means of random attachments.

References Cited in the file of this patent

UNITED STATES PATENTS

| | | |
|---|---|---|
| 1,368,792 | Goodwin | Feb. 15, 1921 |
| 1,394,035 | MacLachlan | Oct. 18, 1921 |
| 2,019,363 | Schulz | Oct. 29, 1935 |
| 2,174,734 | Chuck | Oct. 3, 1939 |